US008475586B2

(12) United States Patent
Gonzalez

(10) Patent No.: US 8,475,586 B2
(45) Date of Patent: Jul. 2, 2013

(54) STRUCTURAL COMPOSITE HAVING NOVEL ORGANIC COMPONENTS AND METHOD OF MANUFACTURE

(76) Inventor: Marcos Gonzalez, Davie, FL (US)

( * ) Notice: Subject to any disclaimer, the term of this patent is extended or adjusted under 35 U.S.C. 154(b) by 21 days.

(21) Appl. No.: 12/724,149

(22) Filed: Mar. 15, 2010

(65) Prior Publication Data

US 2011/0219985 A1 Sep. 15, 2011

(51) Int. Cl.
*C08L 97/00* (2006.01)
*C09D 197/00* (2006.01)
*C09D 189/00* (2006.01)
*C09J 197/00* (2006.01)
*C09J 189/00* (2006.01)

(52) U.S. Cl.
USPC .................. 106/708; 106/123.12; 106/124.1; 106/719; 106/696

(58) Field of Classification Search
USPC .................. 106/123.12, 124.1, 719, 708, 696
See application file for complete search history.

(56) References Cited

U.S. PATENT DOCUMENTS

| | | | | |
|---|---|---|---|---|
| 4,336,051 A | * | 6/1982 | Marquez | 71/6 |
| 5,464,060 A | * | 11/1995 | Hale et al. | 166/293 |
| 5,626,954 A | * | 5/1997 | Andersen et al. | 428/294.7 |
| 5,997,632 A | * | 12/1999 | Styron | 106/705 |
| 6,893,479 B2 | * | 5/2005 | Eswaran et al. | 71/23 |
| 7,922,810 B2 | * | 4/2011 | Atoon | 106/718 |
| 2005/0103235 A1 | * | 5/2005 | Harrison | 106/801 |
| 2005/0129630 A1 | * | 6/2005 | Claes et al. | 424/59 |
| 2007/0105995 A1 | * | 5/2007 | Chatterji et al. | 524/200 |
| 2007/0157854 A1 | * | 7/2007 | Roberts et al. | 106/731 |

OTHER PUBLICATIONS

Tool Base Services. "Fly Ash Concrete". May 9, 2008 [Retrieved on Aug. 5, 2011]. Retrieved from http://web.archive.org/web/20080509022932/http://www.toolbase.org/Technology-Inventory/Foundations/fly-ash-concrete.*
Gutenmann, Walter H.; Doss, James G.; Lisk, Donald J. "Selenium in Swiss chard grown on sewage sludge-cement kiln dust amended soil". Oct. 1993 [Retrieved on Aug. 4, 2011]. Retrieved from [http://www.sciencedirect.com/science/article/pii/0045653593902406].*
Beksheet I.A.; Syrett, P.J. "Urea-degrading enzymes in algae". Jun. 1977 [Retrieved on Aug. 3, 2011]. Retrieved from [http://www.tandfonline.com/doi/abs/10.1080/00071617700650151#preview].*
"Algae Scum of the Earth". Feb. 7, 2006 [Retrieved on Apr. 11, 2012]. Retrieved from http://web.archive.org/web/20060207061822/http://www.botgard.ucla.edu/html/botanytextbooks/economicbotany/Algae/index.html.*
"The Microbial Cell Project on *Cyanobacterium synechocystis* sp. PCC6803". May 5, 2003 [Retrieved on Apr. 16, 2012]. Retrieved from http://synechocystis.asu.edu/.*
Zablackis, Earl; Huang, Jing; Muller, Bernd; Darvill, Alan; Albersheim, Peter. "Characterization of the Cell Wall Polysaccharides of *Arabidopsis thaliana* Leaves". 1995 [Retrieved on Apr. 11, 2012]. Retrieved from http://www.plantphysiol.org/content/107/4/1129.full.pdf+html.*

* cited by examiner

*Primary Examiner* — Kaj K Olsen
*Assistant Examiner* — Karam Hijji
(74) *Attorney, Agent, or Firm* — B. Y. Mathis

(57) ABSTRACT

Various methods for forming structural composites are disclosed. For example, a particular method may include adding an effective amount of algae extract to an aggregate mixture so as to provide a plasticizer to the aggregate mixture, and processing the aggregate mixture to form a hardened composite.

10 Claims, 1 Drawing Sheet

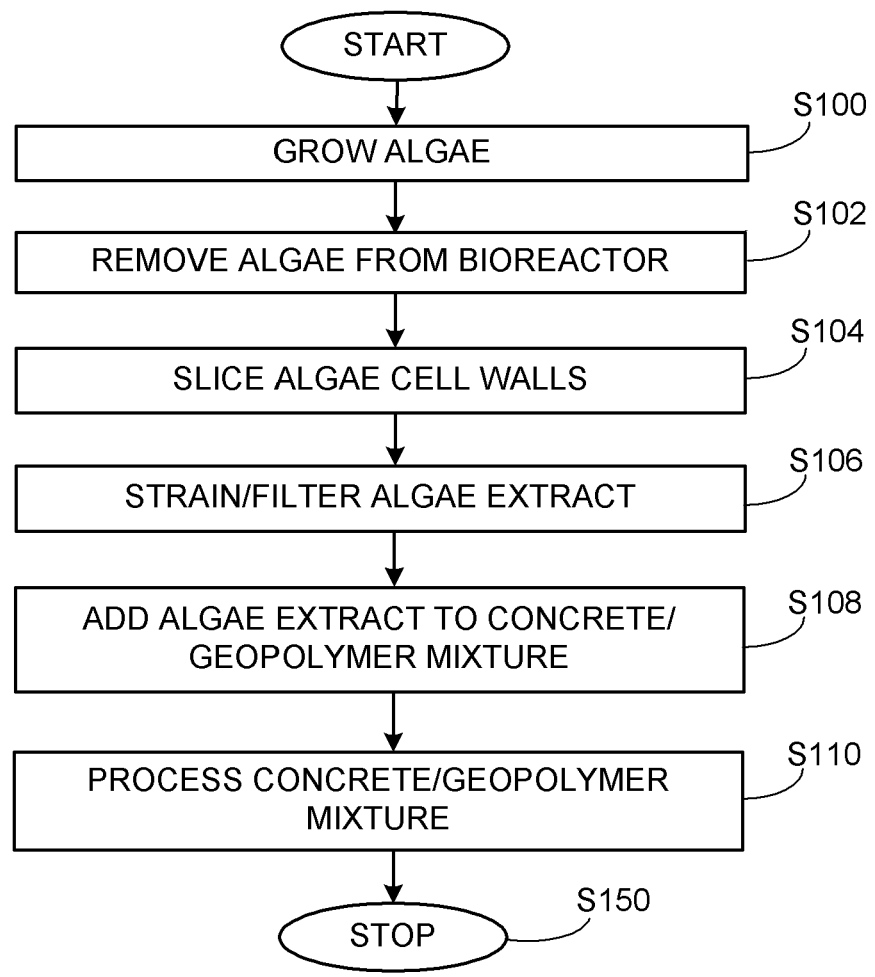

STRUCTURAL COMPOSITE HAVING NOVEL ORGANIC COMPONENTS AND METHOD OF MANUFACTURE

This application incorporates the entire content of U.S. Provisional Application No. 61/158,584 filed on Mar. 13, 2009 by inventor Marcos Gonzalez.

BACKGROUND

I. Field

This disclosure relates to geopolymer or other concrete-like materials using algae-produced materials for plasticizers and/or accelerants.

II. Background

The term "geopolymer" refers to a class of synthetic aluminosilicate materials with potential use in a number of areas, but predominantly as a replacement for Portland cement. Compared to Portland cement, geopolymers have lower carbon dioxide production emissions, greater chemical and thermal resistance and better mechanical properties at both atmospheric and extreme conditions.

Geopolymers are generally formed by reaction of an aluminosilicate powder with an alkaline silicate solution at roughly ambient conditions. Conventional geopolymers can be made from natural sources of pozzolanic materials, such as lava or fly ash from coal. Most studies have been carried out using natural or industrial waste sources of metakaolin and other aluminosilicates.

A particular ingredient used in the production of concrete and geopolymers is known as a "plasticizer." Plasticizers are water reducers or dispersants that can be added to concrete/geopolymer mixtures to improve workability. Generally, the strength of a concrete is inversely proportional to the amount of water added or water-cement (w/c) ratio. In order to produce a stronger concrete/geopolymer, less water is added. Too little water, however, "starves" the mix, which makes the concrete/geopolymer mixture very unworkable and difficult to mix, necessitating the use of plasticizers.

In ancient times, the Romans used animal fat, milk and animal blood as a plasticizer for their concrete mixes. More modern plasticizers are commonly manufactured from lignosulfonates and sulfonated napthalene, better known as sulfonated melamine or formaldehyde. These chemicals are by-products from the paper manufacturing.

Unfortunately, such chemicals can be toxic and environmentally unfriendly, and use of such plasticizers requires dependency of the formidable infrastructure needed to produce such chemicals. Accordingly, new and more environmentally friendly approaches to the production of plasticizers are desirable.

SUMMARY

Various aspects and embodiments of the invention are described in further detail below.

In an embodiment, a method for forming a structural composite can include adding an algae extract to an aggregate mixture so as to provide an effective plasticizer to aggregate mixture, and processing the aggregate mixture to form a hardened composite.

In another embodiment, a structural composite can include a geopolymer made from an aggregate including an algae extract acting as an effective plasticizer.

BRIEF DESCRIPTION OF THE DRAWINGS

The features and nature of the present disclosure will become more apparent from the detailed description set forth below when taken in conjunction with the accompanying drawings in which reference characters identify corresponding items.

FIG. 1 is a flowchart outlining an exemplary operation.

DETAILED DESCRIPTION

The disclosed methods and systems below may be described generally, as well as in terms of specific examples and/or specific embodiments. For instances where references are made to detailed examples and/or embodiments, it should be appreciated that any of the underlying principals described are not to be limited to a single embodiment, but may be expanded for use with any of the other methods and systems described herein as will be understood by one of ordinary skill in the art unless otherwise stated specifically.

The following definitions apply for this disclosure:

Aggregate: a component of a composite material used to resist compressive stress.

Structural composite: a concrete, a geopolymer or a cryptobiotic material.

This disclosure describes a novel process and mixtures producing a structural composite suitable as a building material. The process and resultant materials can produce structures that are both low-cost and durable compared to structures made of conventional building materials.

The process starts in step S100 where one or more targeted species of algae is grown. In the non-limiting example of this disclosure, the algae used may include Synechocystis (PCC 6803) and/or any number of species of the collenia genus noting that there may be a wide range of suitable microbes. Because these organisms (cyandobacteria) reproduce asexually, they can be cultured in bioreactors by a photosynthesis process. Next, in step S102 the algae may be removed from the bioreactor or whatever growth medium/mechanism is used. Control continues to step S104.

In step S104 the cell walls of the algae may be sliced or otherwise ruptured by any number of known or later-developed process, such as a high-speed blending process, application of ultra-sonic energy, chemical treatment, and so on. Next, in step S106, the various enzymes, lipids and other contents of the sliced/ruptured algae may be strained/filtered from the algae cell walls and thus separated. For the purpose of this disclosure, the strained portion of the algae may be referred to as an algae extract. It is to be appreciated that the algae extract may be combined with laminin, a protein binder from animal blood plasma and/or with keratin. The algae extract and/or modified algae extract may thus be made into a fluid which is a viscous biofilm resulting in a natural plasticizer.

The steps above can produce polycarboxylate ethers (PCE) or just polycarboxylate (PC). PCE/PC represents a new generation of plasticizers that are not only chemically different from the older sulfonated melamine and naphthalene-based products, but their action mechanism is also different. That is, PCE/PC can act by causing particle dispersion of a composite by steric stabilisation. In contrast, conventional plasticizers use an electrostatic repulsion effect to achieve particle dispersion.

The steric stabilisation form of dispersion is more powerful in its effect and gives improved workability retention to the cementitious mix. Furthermore, the chemical structure of PCE allows for a greater degree of chemical modification than the older-generation products, offering a range of performance that can be tailored to meet specific needs. Control continues to step S108.

Referring to step S108, the algae extract (or any number of modified algae extracts) may be added to an aggregate mixture for concrete or any number of concrete of geopolymer formulations. With regard to geoploymers, a theory arises that sepiolite (e.g., polygorskite with a biofilm blend of enzymes and genus species of cryptomatic soils and cyanobacteria cultures) can act as carrier minerals that break down as the alkalinity rises, thus delivering soluble and mobile $SiO_2$ and $Al_2O_3$ for pozzolanic reactions that form more polymeric minerals. In various embodiments, the reaction may be accelerated with reactive magnesium oxide, which can produce stronger bonds and control the PH during the reaction curve. Polycondensation of organic substances (natural polymers, proteins, enzymes and minerals produced organic and inorganically by chemical reactions that result in cross-linked through hydrogen bonding forming covalent bonds of aggregates and materials, which in turn may form cryptomatic composites.

The combination of the biofilm (enzymes) produced by the algae microbes with keratin and laminin can produce an effective bonding agent by geosynthesis to in turn create covalent bonds with a cross-linking matrix in combination with conventional geopolymer aggregates when combined with aluminum silacate, selenium, humic acid, sodium metasilrate reactive magnesium oxide and fly ash.

An accelerant (e.g., calcium hydroxide with structured water) (15%-20% H2O) may be added to increase exothermal reaction to bond the enzymes into the mixture with coarse and fine aggregates (e.g., low calcium fly ash).

Also, polymers for tensile elements or fibers may be added.

Hydration may be achieved using fresh water, salt water or structured water (water made by electrolysis) at a Ratio of 15%-20% by weight of aggregates. The percentage of algae extract may vary, but it is envisioned that an effective amount of extract may, depending on variations of aggregated and chemistry, range from less than 5%, e.g., 1%-3%, by weight of aggregates.

In step S110, the aggregate mixture can be further processed to form a composite. In various examples, such processing may include adding more water, noting that less water may be added when adding accelerants or surfactants (foam) or air; mixing in a rotary (or other) mixer; pouring the aggregate mixture; and allowing the mixture to set and cure into a hardened composite.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for forming a structural composite, the method comprising:
    adding an algae extract to an aggregate mixture so as to provide an effective plasticizer to the aggregate mixture, wherein the algae extract includes an enzyme produced by the algae; and
    processing the aggregate mixture to form a hardened composite,
    wherein deriving the algae extract includes the steps of: growing an amount of algae; breaking the cell walls of the grown algae; and separating the algae extract from cell wall material.

2. The method of claim 1, wherein the algae extract is added in the ratio of 1%-3% in weight of the aggregate mixture.

3. The method of claim 1, wherein the aggregate mixture includes an effective amount of reactive magnesium oxide acting as an accelerant.

4. The method of claim 1, wherein the aggregate mixture includes aluminum silicate, selenium, humic acid, sodium metasilicate, reactive magnesium oxide and fly ash.

5. The method of claim 1, wherein deriving the algae extract further includes adding at least one of keratin and laminin to the filtered algae extract.

6. The method of claim 1, wherein the algae of the algae extract is predominately a cyanobacteria.

7. The method of claim 6, wherein the cyanobacteria comprises *Synechocystis*.

8. The method of claim 1, wherein the algae extract is added in the ratio of less that 5% in weight of the aggregate mixture.

9. The method of claim 1, wherein the algae extract includes only a portion of algae bodies.

10. The method of claim 9, wherein deriving the algae extract further includes straining ruptured bodies of the algae.

* * * * *